UNITED STATES PATENT OFFICE 2,571,117

CERTAIN RESINS AND OXYALKYLATED DERIVATIVES THEREOF

Melvin De Groote, University City, and Bernhard Keiser, Webster Groves, Mo., assignors to Petrolite Corporation, Ltd., Wilmington, Del., a corporation of Delaware No Drawing. Application January 6, 1950, Serial No. 137,292

11 Claims. (Cl. 260—53)

The present invention is concerned with certain new resins derived from mixtures of certain difunctional phenols and salicylic acid in combination with a reactive aldehyde.

The present invention is additionally concerned with certain new chemical products, compounds or compositions having useful application in various arts. The present application is a continuation in part of our co-pending application Serial No. 8,723, filed February 16, 1948, now Patent 2,499,366, granted March 7, 1950. It includes methods or procedures for manufacturing said new resins and said new chemical products, compounds or compositions, as well as the resin, products, compounds, or compositions themselves. Said new compositions are hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, xylene-soluble, water-insoluble, acid-catalyzed, low-stage, phenol-aldehyde resin; said resin being derived by reaction between a mixture of a difunctional monohydric hydrocarbon-substituted phenol and salicylic acid on the one hand, and an aldehyde having not over 8 carbon atoms and reactive towards both components of the mixture on the other hand; the amount of salicylic acid employed in relation to the non-hydroxylated phenol being sufficient to contribute at least one salicylic acid radical per resin molecule; said resin being formed in the substantial absence of trifunctional phenols, and said phenol being of the formula:

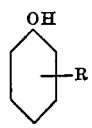

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 30, with the proviso that at least 2 moles of alkylene oxide be introduced for each phenolic nucleus.

The new resins herein described are the products which serve as the initial material for preparing the oxyalkylated products described in the preceding paragraph.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 137,291, filed January 6, 1950.

As will be apparent hereafter, the present invention involves as a reactant a new type of resin prepared from salicylic acid in conjunction with an alkylated phenol and an aldehyde. Such resin is of a peculiar nature from the standpoint of chemical reactivity, by virtue of the carboxyl radical, and is completely soluble in non-polar solvents such as xylene. Such resin has oil-solubility of an entirely different character than that of resins obtained solely from salicylic acid. This phase of the invention more specifically is described and claimed in our co-pending application Serial No. 137,293, filed January 6, 1950.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes, as lubricants, etc.

As has been pointed out previously, one phase of the invention is concerned with the preparation of resins from salicylic acid and a difunctional monohydric hydrocarbon-substituted phenol, or phenols. In other words, there must be at least one difunctional phenol, such as butyl phenol, amyl phenol, hexyl phenol, otcyl phenol, decyl phenol, dodecyl phenol, and salicylic acid, but one may employ a mixture, for instance, one mole of amyl phenol and one or more moles of butyl phenol, in combination with salicylic acid; or one mole of octyl phenol and one or more moles of nonyl phenol in combination with salicylic acid; or one mole of decyl phenol and one or more moles of dodecyl phenol, in combination with salicylic acid.

To avoid awkward and cumbersome terminology which may be confusing, reference in this application and in the claims to a "difunctional monohydric hydrocarbon-substituted phenol and salicylic acid" or equivalent language, does not mean that one must use a single phenol, but, as pointed out, a mixture of such phenols is equally satisfactory. Similarly, the expression "non-carboxylated phenol," unless otherwise qualified, includes either a single non-carboxylated phenol, or a mixture of one or more non-carboxylated phenols.

Reference has been made to salicylic acid. The other isomer, para-hydroxy benzoic acid, would, of course, serve just as satisfactorily as salicylic acid, but it happens that para-hydroxy benzoic acid sells at several times as much per pound and seems to yield compounds which are of no increased value. For this reason reference is made to salicylic acid, but it is obvious that the isomeric compound is the functional equivalent.

For purpose of convenience, what is said hereinafter will be divided into two parts:

Part 1 will be concerned with the production of the resin from a mixture of the kind specified and described in greater detail subsequently; and Part 2 will be concerned with the oxyalkylation of the resin so as to convert it into a hydrophile hydroxylated derivative.

PART 1

The production of resins from difunctional hydrocarbon-substituted phenols is well known and such resins are important in the art, particularly in the preparation of varnishes or similar coatings. The literature contains references to the preparation of salicylic acid resins. These particular resins, as far as we are aware, have not found any utility whatsoever in any industrial field. We know of no other utility for the resins derived from the mixture herein described other than what is said in the instant application.

For reasons which become obvious, it is believed it may be well to note the preparation of a suitable resin from a hydrocarbon-substituted, difunctional, monohydric phenol alone, and also a resin made from salicylic acid alone. Certain advantages in manipulation, etc., will become obvious in regard to such instances where a mixture of reactants is employed, as in the instant application, insofar as the present invention is concerned.

Example 1a

|  | Grams |
|---|---|
| Para-tertiary butylphenol | 150 |
| Formaldehyde 37% | 81 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalysts and as emulsifiers particularly in the form of sodium salts include the following:

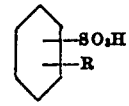

(R is an alkyl hydrocarbon radical having 12–14 carbon atoms.

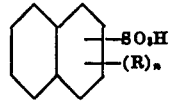

(R is an alkyl radical having 3–12 carbon atoms and $n$ represents the numeral 3, 2 or 1, usually 2, in such instances where R contains less than 8 carbon atoms.

(With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and interchangeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending upon the position of the three-way glass stop-cock. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot above described. This particular phenol was in the form of a flaked solid. Heat was applied with gentle stirring and the temperature was raised to 80–85° C., at which point a mild exothermic reaction took place. This reaction raised the temperature to approximately 105–110° C. The reaction mixture was then permitted to reflux at 100–105° C. for between 1 and 1½ hours. The reflux trap arrangement was then changed from the reflux position to the normal water entrapment position. The water of solution and the water of reaction were permitted to distil out and collect in the trap. As the water distilled out the temperature gradually increased to approximately 150° C., which required between 1.5 to 2 hours. At this point the water recovered in the trap, after making allowance for a small amount of water held up in the solvent, corresponded to the expected quantity.

The solvent solution, so obtained, was used as such in subsequent oxyalkylation steps. We have also removed the solvent by conventional means, such as evaporation, distillation or vacuum distillation, and we customarily take a small sample of the solvent solution and evaporate the solvent to note the characteristics of the solvent-free resin. The resin obtained in the operation above described was clear, light amber-colored, hard, brittle, and had a melting point of 160–165° C.

Attention is directed to the fact that tertiary butylphenol, in presence of a strong mineral acid as a catalyst and using formaldehyde, sometimes yields a resin which apparently has a very slight amount of cross-linking. Such resin is similar to the one described above, except that it is somewhat opaque, and its melting point is higher than the one described above and there is a tendency to cure. Such a resin is generally dispersible in xylene, but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience, due to better solubility in xylene, we prefer to use a clear resin, but if desired, either type may be employed. (See Example 1a of aforementioned co-pending application Serial No. 8,723, filed February 16, 1948.)

*Example 2a*

| | Grams |
|---|---|
| Salicylic acid (U. S. P. grade) | 150 |
| Formaldehyde 30% | 75 |
| Water | 200 |
| Concentrated HCl | 5 |

The above ingredients were combined in a conventional glass flask with a stirring device and condenser. The mixture was refluxed for 20 hours at a temperature of approximately 100° C., or slightly in excess thereof. At the end of this time there separated out an aqueous layer and a resinous layer, and the aqueous layer was withdrawn. The non-aqueous layer, which was more or less a solid, was heated to 240°–250° C., during which time the remainder of the water present was eliminated. The resultant resin was clear, brittle and hard. It was not xylene-soluble, but was soluble in a mixture consisting of 50% xylene and 50% diethylene glycol diethylether. (See Example 196a of aforementioned co-pending application Serial No. 8,723, filed February 16, 1948.)

*Example 3a*

| | Grams |
|---|---|
| Salicylic acid | 150 |
| Hexamethylenetetramine | 34 |
| Alcohol (ethyl) | 400 |

The above mixture was refluxed for 20 hours. At the end of this time the mixture was heated to 150° C. with a distillation of all the alcohol. The resultant product was a dark red hydroscopic resin. This resin was then dissolved in 600 grams of anhydrous methyl alcohol, and 2 grams of para-toluene sulfonic acid added as a catalyst. This mixture was then refluxed for 20 hours. At the end of this time the alcohol was removed along with water of esterification. The resin was dissolved again in another 600-gram lot of methyl alcohol and again refluxed for 20 hours. At the end of this time the alcohol and water were distilled off again and the resin dissolved for a third time in 600 grams of anhydrous methyl alcohol and again refluxed for 20 hours. At the end of this period of time the methanol and water formed were distilled off, yielding the methyl ester in presence of a small amount of sulfonic acid present, as a catalyst.

The resin was dark red in color and very soft. It was not soluble in xylene, but 100 grams of resin made a very satisfactory solution with 50 parts of xylene and 50 parts of diethylene glycol diethylether. (See Example 197a of aforementioned co-pending application Serial No. 8,723, filed February 16, 1948.)

*Example 4a*

| | Grams |
|---|---|
| Salicylic acid (2.0 moles) | 276 |
| Formaldehyde 37% (2.0 moles) | 162 |
| Concentrated HCl | 3 |
| Monoalkyl ($C_{10}$–$C_{20}$, principally $C_{12}$–$C_{14}$) benzene monosulfonic acid sodium salt | 1 |
| Xylene | 475 |
| Diethylene glycol diethylether | 50 |

The same procedure was followed as was described under the heading of Example 1a, except that the initial reflux period was 2½ hours instead of 1½ hours. At the end of this first reflux period there was still a strong odor of formaldehyde present. Two grams more of concentrated hydrochloric acid were added. The mixture was then refluxed for 5½ hours more, at which time there was still a strong odor of formaldehyde present in a sample of the aqueous distillate from the reflux condenser. As a result, 10 more grams of hydrochloric acid were added and the reflux procedure continued for a third period of 17 hours. During this last reflux period the trap arrangement was changed so as to permit the aqueous distillate to distil over and be trapped. This distillate still carried some odor of formaldehyde and there was also some uncombined salicylic acid remaining in the hot solution; probably more than 90%, and possibly 95% of the reactants, entered into the reaction. The salicylic acid remaining in the reaction mass was filtered out hot. On cooling, the solution became thick and syrupy, but was of sufficient solubility and viscosity to be suitable for oxyalkylation. (See Example 198a of aforementioned co-pending application Serial No. 8,723, filed February 16, 1948.)

*Example 5a*

| | Grams |
|---|---|
| Salicylic acid | 276 |
| HCHO 37% | 162 |
| Water | 600 |
| Xylene | 100 |

The same procedure was followed as in Example 1a, preceding, except that the reflux period was 8 hours. At the end of this time there was still a strong odor of formaldehyde present in the vapors and there was present in the flask unreacted salicylic acid. For this reason another mole of formaldehyde was added (81 grams) and the resinification period repeated for another 8 hours. At the end of this time the water was distilled off along with the unreacted formaldehyde. By the time the water was distilled off, the product was acting like a typical salicylic acid resin, insofar that it began to separate out from the xylene solution. For this reason 50 grams of diethylene glycol diethylether were added and then the mixture distilled so as to remove 50 grams of xylene. When this final product was allowed to cool and stand, it remained clear.

Reference is made to the two types of resins which have been previously disclosed, to wit, conventional resins derived from alkylated phenols, which are xylene-soluble, but do not include in the resin molecule a carboxyl group for reactions of the kind in which the carboxyl radical is involved, such as esterification, amidification, etc. Likewise, there has been illustrated the salicylic acid resins which are not particularly oil-soluble and are not xylene-soluble, but whose solubility depend on the addition of a more expensive oxygenated solvent, such as diethylene glycol diethylether, or an alcohol, which, of course, is oxyalkylation-susceptible.

Therefore, in order to prepare the type of materials herein described, we have had to prepare a new reactant, to wit, a resin derived from a combination in which salicylic acid and alkylated phenols are used so as to yield a resin molecule which is xylene-soluble and reactive towards reagents which combine with carboxyl radicals. This aspect of our invention, as previously noted, is considered in our co-pending application, Serial No. 137,293, filed January 6, 1950.

The value of salicylic acid as a resin-making compound for the production of compounds for use in the present invention, rests not so much in the use of the product as such, as in its use in admixture with other phenolic reactants. Thus, if one makes a mixture of approximately 4 moles of para-amylphenol for example, and one mole of salicylic acid and resinifies the mixture, there are two advantages:

(1) The mixture is soluble, or at least, it can be handled in xylene much more advantageously than resins from salicylic acid alone; and (2) One obtains a resin which has certain possibilities for further reaction which are not present in the usual hydrocarbon-substituted phenol.

In its simplest aspect, it may be represented in an idealized form in the following manner:

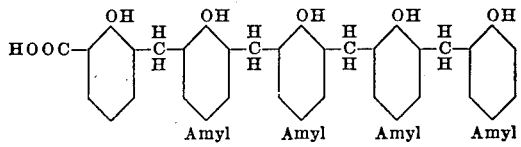

The above formula is, of course, an idealized structure, for obvious reasons, because the salicylic acid nucleus presumably can appear at any point in the resin molecule. Such resin, or, for that matter, a resin having an increased number of salicylic acid radicals, can be oxyalkylated in the same manner as other phenol-aldehyde resin.

The reactive carboxyl radical permits a number of variations. Thus, the resin can be reacted with reagents, such as ethylene glycol, glycerol, triethanolamine, diethanolamine, etc. (See Example 199a of aforementioned co-pending application Serial No. 8,723, filed February 16, 1948.)

Example 6a

| | Grams |
|---|---|
| Salicylic acid | 69 |
| Para-tertiary amylphenol | 328 |
| Monoalkyl ($C_{10}$–$C_{20}$, principally $C_{12}$–$C_{14}$) benzene monosulfonic acid sodium salt | 1.5 |
| Concentrated HCl | 20 |
| Xylene | 400 |
| Formaldehyde | 208 |

The same procedure was followed as in Example 1a, except that the amount of hydrochloric acid employed is comparatively high, to wit, 20 grams, and the reflux time, instead of being 1½ hours was 3 hours. Only a very small amount of salicylic acid was lost on evaporation. The resin was soft and tacky, and xylene-soluble. (See Example 200a of aforementioned co-pending application Serial No. 8,723, filed February 16, 1948.)

Example 7a

| | |
|---|---|
| Para-tertiary amylphenol (4.0 moles) grams | 656 |
| Salicylic acid (1.0 mole) do | 138 |
| Formaldehyde 37% (5.0 moles) do | 405 |
| Xylene do | 700 |
| HCl (concentrated) ml | 40 |
| Dodecyl toluene monosulfonic acid sodium salt grams | 3 |

The same procedure was followed as in Example 1a, preceding, except that the reflux period was 5 hours instead of 1½ hours. Also, note the marked increase in amount of acid used as a catalyst in this instance.

The resin solution, so obtained, contained approximately 45% xylene. The solvent-free resin was reddish-amber in color, slightly opaque, obviously xylene-soluble, and somewhat hard to pliable in consistency.

Example 8a

| | |
|---|---|
| Para-tertiary nonylphenol (4.0 moles) grams | 880 |
| Salicylic acid (1.0 mole) do | 138 |
| Formaldehyde 37% (5.0 moles) do | 405 |
| Xylene do | 600 |
| HCl (concentrated) ml | 40 |
| Dodecyl toluene monosulfonic acid sodium salt grams | 3 |

The same procedure was followed as in Example 1a, preceding, except that the reflux period was 5 hours instead of 1½ hours. Also, note the marked increase in amount of acid used as a catalyst in this instance.

The resin solution, so obtained, contained approximately 38.5% xylene. The solvent-free resin was clear, pale reddish amber in color, xylene-soluble, and soft to semi-pliable in consistency.

Example 9a

| | |
|---|---|
| Para-tertiary butylphenol (4.0 moles) grams | 600 |
| Salicylic acid (1.0 mole) do | 138 |
| Formaldehyde 37% (5.0 moles) do | 405 |
| Xylene do | 700 |
| HCl (concentrated) ml | 40 |
| Dodecyl toluene monosulfonic acid sodium salt grams | 3 |

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 46.6% xylene. The solvent-free resin was pale reddish amber in color, slightly opaque, xylene-dispersible, and hard but not brittle in consistency, with a low melting point.

Example 10a

Para-secondary butylphenol (4.0 moles)
grams__ 600
Salicylic acid (1.0 mole) _____do____ 138
Formaldehyde 37% (5.0 moles) _____do____ 405
Xylene _____do____ 700
Dodecyl toluene monosulfonic acid sodium
  salt _____grams__ 3
HCl (concentrated) _____ml__ 40

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 46.5% xylene. The solvent-free resin was amber in color, slightly opaque, and almost entirely soluble in xylene. It was fairly hard or pliable in consistency.

Example 11a

Menthylphenol (4.0 moles) _____grams__ 928
Salicylic acid (1.0 mole) _____do____ 138
Formaldehyde 37% (5.0 moles) _____do____ 405
Xylene _____do____ 700
HCl (concentrated) _____ml__ 40
Dodecyl toluene monosulfonic acid sodium
  salt _____grams__ 3

The same procedure was followed as in Example 1a, preceding, except that the reflux period was 5 hours instead of 1½ hours. Also, note the marked increase in amount of acid used as a catalyst in this instance.

The resin solution, so obtained, contained approximately 41.5% xylene. The solvent-free resin was deep red or reddish-amber in color, clear, xylene-soluble, and pliable but not hard in consistency.

Example 12a

Para-tertiary octylphenol (4.0 moles)
grams__ 824
Salicylic acid (1.0 mole) _____do____ 138
Formaldehyde 37% (5.0 moles) _____do____ 405
Xylene _____do____ 650
HCl (concentrated) _____ml__ 40
Dodecyl toluene monosulfonic acid sodium
  salt _____grams__ 3

The same procedure was followed as in Example 1a, preceding, except that the reflux period was 5 hours instead of 1½ hours. Also, note the marked increase in amount of acid used as a catalyst in this instance.

The resin solution, so obtained, contained approximately 38.8% xylene. The solvent-free resin was reddish amber in color, clear, xylene-soluble and semi-hard to pliable in consistency.

Example 13a

Para-tertiary amylphenol
  (3.0 moles) _____grams__ 492
Salicylic acid (2.0 moles) _____do____ 276
Formaldehyde 37% (5.0 moles) _____do____ 405
Xylene _____do____ 700
HCl (concentrated) _____ml__ 40
Dodecyl toluene monosulfonic acid
  sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 48.8% xylene. The solvent-free resin was reddish amber in color, clear, xylene-soluble and semi-soft or pliable in consistency.

Example 14a

Para-secondary butylphenol
  (3.0 moles) _____grams__ 450
Salicylic acid (2.0 moles) _____do____ 276
Formaldehyde 37% (5.0 moles) _____do____ 405
HCl (concentrated) _____ml__ 40
Xylene _____grams__ 700
Dodecyl toluene monosulfonic acid
  sodium salt _____do____ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency.

Example 15a

Para-tertiary butylphenol
  (3.0 moles) _____grams__ 450
Salicylic acid (2.0 moles) _____do____ 276
Formaldehyde 37% (5.0 moles) _____do____ 405
HCl (concentrated) _____ml__ 40
Xylene _____grams__ 700
Dodecyl toluene monosulfonic acid
  sodium salt _____do____ 3

The same procedure was followed as in Example 1a, preceding, except that the reflux period was 5 hours, instead of 1½ hours. Also, note the marked increase in amount of acid used as a catalyst in this instance.

The resin solution contained approximately 44.2% xylene. The solvent-free resin was pale reddish amber in color, almost clear, and fairly hard or pliable in consistency.

Example 16a

Para-octylphenol (3.0 moles) _____grams__ 618
Salicylic acid (2.0 moles) _____do____ 276
Formaldehyde 37% _____do____ 405
Xylene _____do____ 700
HCl (concentrated) _____ml__ 40
Dodecyl toluene monosulfonic acid
  sodium salt_____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency.

Example 17a

Para-menthylphenol (3.0 moles) ___grams__ 696
Salicylic acid (2.0 moles) _____do____ 276
Formaldehyde 37% (5.0 moles) _____do____ 405
Xylene _____do____ 700
HCl (concentrated) _____ml__ 40
Dodecyl toluene monosulfonic acid
  sodium salt _____grams__ 3

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 40.3% xylene. The solvent-free resin was slightly softer in consistency than the resultant in Example 11a, preceding, but it had the same deep red or reddish amber color, and was clear, xylene-soluble and pliable but not hard.

*Example 18a*

| | Grams |
|---|---|
| Para-tertiary nonylphenol (3.0 moles) | 660 |
| Salicylic acid (2.0 moles) do | 276 |
| Formaldehyde 37% (5.0 moles) do | 405 |
| Xylene do | 700 |
| HCl (concentrated) ml | 40 |
| Dodecyl toluene monosulfonic acid sodium salt grams | 3 |

The same procedure was followed as in Example 1a, preceding, except that the reflux period was 5 hours, instead of 1½ hours. Also, note the marked increase in amount of acid used as a catalyst in this instance.

The resin solution, so obtained, contained approximately 41.2% xylene. The solvent-free resin was pale reddish amber in color, xylene-soluble, clear, and quite soft in consistency.

*Example 19a*

| | Grams |
|---|---|
| Para-tertiary amylphenol (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed, the procedure was changed slightly from that employed in Example 1a. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water, or slightly above, i. e., 100°–110° C., before distilling out water. The amount of water distilled out was 102 cc. Compare this procedure with that employed in Example 24a in Serial No. 8,723, filed February 16, 1948.

The resin solution, so obtained, contained approximately 41.2% xylene. The solvent-free resin was reddish black, clear, xylene-soluble and hard but not brittle in consistency.

*Example 20a*

| | Grams |
|---|---|
| Para-tertiary butylphenol (4.0 moles) | 600 |
| Salicylic acid (1.0 mole) | 138 |
| Propionaldehyde 96% (5.0 moles) | 305 |
| Sulfuric acid | 20 |
| Xylene | 700 |

The procedure followed was the same as that outlined in Example 19a, preceding. The resin solution, so obtained, contained approximately 42.6% xylene, and the solvent-free resin was reddish black in color, clear, hard and brittle, xylene-soluble, and had a melting point of about 82° C.

*Example 21a*

| | Grams |
|---|---|
| Para-secondary butylphenol (4.0 moles) | 600 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained approximately 42.6% xylene. The solvent-free resin was reddish black in color, clear and xylene-soluble. It was fairly hard and semi-pliable in consistency.

*Example 22a*

| | Grams |
|---|---|
| Para-octylphenol (4.0 moles) | 824 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained approximately 37.5% xylene. The solvent-free resin was dark amber in color, but clear and xylene-soluble, and hard but not brittle in consistency.

*Example 23a*

| | Grams |
|---|---|
| Methylphenol (4.0 moles) | 928 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained about 35.6% xylene. The solvent-free resin was reddish black and clear, in color; xylene-soluble and fairly hard to semi-pliable in consistency.

*Example 24a*

| | Grams |
|---|---|
| Nonylphenol (4.0 moles) | 880 |
| Salicylic acid (1.0 mole) | 138 |
| Propionaldehyde 96% (5.0 moles) | 305 |
| Sulfuric acid | 20 |
| Xylene | 700 |

The same procedure was followed as in Example 19a, preceding. The resin solution, so obtained, contained about 36.5% xylene. The solvent-free resin was reddish-black and clear in color; xylene-soluble and semi-hard to pliable in consistency.

In a number of cases phenols are simply designated as nonylphenol, etc., without specific designation of the position of substitution or the structure of the substituent radical. In such cases the phenols meant are either the commercial products distributed under these names, or, if the products are not commercially available, the products obtained by customary syntheses from phenol, meta-cresol or 3,5-xylenol, and consist mainly of the para-substituted product, usually associated with some of the ortho-substituted product, perhaps a very small proportion of meta-substituted material, some impurities, etc. Also it is to be understood that all of the products of the foregoing examples, unless it is otherwise stated in the example, are soluble in xylene, at least to an extent sufficient to permit the use of xylene as the solvent in oxyalkylation.

Attention is directed to the use of C-10 to C-14 substituted phenols. We have found these higher substituted phenols can replace an equivalent amount of the lower substituted phenols in any one of the preceding examples, using mixtures of salicylic acids, and particularly phenols, in the same molal ratio, for instance, particularly Example 6a or 7a. In fact, particularly attractive mixed resins are obtained using tetradecylphenol.

Difunctional tetradecylphenols are available at an attractive price. One grade of these particular phenols consists of a mixture representing about 90% para-substituted phenol, 5% ortho-substituted phenol, and 5% meta-substituted phenol. Although the same amount of meta-substituent is comparatively large compared with other difunctional phenols, it appears unobjectionable, due to the comparatively large side chain. For example, compare with the preparation of soluble thermoplastic phenols from cardanol, or side chain hydrogenated cardanol. One grade of this material is manufactured by the Oronite Chemical Company and designated as tetradecylphenol, grade 14-6069P. We have prepared resins from such phenol alone, or in admixture, following the same procedure described in specific examples preceding. As a specific example, we have substituted this particular tetradecylphenol in Examples 6a, 7a, and 19a, and have obtained products having similar characteristics, except that, if anything, the resins were somewhat darker and somewhat more fluid. Similarly, tetradecylphenol can be used with acetylene in combination with the other aldehydes described.

The use of the higher alkylated phenols, particularly decylphenol, dodecylphenol and tetradecylphenol, in the preparation of salicylic acid containing resins is, of course, not limited to the use of such non-carboxy phenols alone, but one can, of course, make mixtures which give excellent results; for instance, one part of salicylic acid, two parts of para-tertiary amylphenol, and two parts of tetradecylphenol grade 14-6069P, previously described. In a similar mixture the amylphenol can be replaced by butylphenol, or octylphenol; likewise, in analogous mixtures the tetradecylphenol could be replaced by decylphenol or dodecylphenol. All of this is perfectly obvious in light of what has been said previously and requires no further description.

In the preceding examples the aldehydes used have been formaldehyde and propionaldehyde. Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde in its cheapest form of an aqueous solution, for the production of the resins, is particularly advantageous. Solid polymers of formaldehyde are more expensive and higher aldehydes are both less reactive and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde on one hand, and a comparable product prepared from the same phenolic reactant and heptaldehyde on the other hand. The former, as shown in certain subsequent examples, is a hard, brittle, solid, whereas, the latter is soft and tacky, and obviously easier to handle in the subsequent oxyalkylation procedure.

There is a limit to the use of certain aldehydes insofar that the herein described resins are obtained by the use of an acid catalyst. The use of furfural, in preparing phenolic resins, is generally limited to the use of an alkaline catalyst. Since alkaline catalysts would combine with the carboxyl of the salicylic acid radical, we have not found such modification desirable. When an acid catalyst is used, a furfural condensation is apt to take place. In any event, the selection of the aldehyde and a catalyst must be compatible with the use of the salicylic acid, and for practical purposes, this seems to limit the method in a large measure to acid catalysts, such as those described. As is well known, resins of the kind herein described contain at least three phenolic nuclei. The resins herein described, including use of salicylic acid, are usually formed in the presence of a large amount of an acid catalyst. This means that the resin is apt to give more than three nuclei; in other words, an average of 4, 5, 5½ or 6 nuclei per resin molecule.

As pointed out in our aforementioned copending application, Serial No. 8,723, other means are available to yield resins in which there may be present a larger number of phenolic nuclei, for instance, 7 to 15. Such resins are conveniently obtained by subjecting the resin obtained in the conventional manner to further treatment under a vacuum at a temperature below the pyrolitic point of the resin. Sometimes the expression "low-stage" resin or "low-stage" intermediate is employed to mean a stage having 6 or 7 units or even less. In the appended claims we have used "low-stage" to means 3 to 7 units, based on average molecular weight.

In the examples given we have found that the resin unit is apt to contain on the average of about 5 nuclei. For convenience, we have arbitrarily introduced either one or two moles of salicylic acid per resin unit. A larger number, for instance, 3 or 4, could be introduced, particularly if the resin unit were larger, for instance, contained 6 or 7 units. Such resins can be prepared at substantially higher temperatures, substituting cymen, tetralin, or some other suitable solvent which boils at a higher temperature instead of xylene, and increasing the amount of catalyst somewhat, for instance, doubling or tripling the quantity of catalyst. For practical purposes, our preference is a resin having approximately 4 to 5 phenolic units per resin molecule with 1 or 2 of such units being contributed by the salicylic acid radical.

Summarizing what has been said previously, it will be noted that these resins are "low-stage" resins, i. e., have 7 aromatic nuclei or less, and that there is always a plurality of alkylated phenol nuclei, in comparison with the salicylic acid nuclei, and preferably, not more than one unit is contributed by salicylic acid in a chain of a total of about 4 or 5 units. Needless to say, if one mixes one part of salicylic acid with three parts, four parts, or 3½ parts of an alkylated phenol, and produces a resin, one does not necessarily obtain a 4-unit, 5-unit, or 4- and 5-unit half-and-half mixture; but there are produced some 3-unit resin chains, some 4, some 5, some 6, and possibly a few 7-unit chains. The length of chain, is, of course, based on molecular weight determinations, using either the freezing point depression or boiling point rise. Such basis, of course, must be a statistical average, for reasons just noted. The outstanding type of resin is the oil-soluble resin having a total length equivalent to 4-to-6 phenolic nuclei of which one, and only one, is salicyclic acid.

PART 2

We have previously pointed out that the manufacture of these resins is similar to that employed in manufacturing resins from an alkylated phenol alone, as distinguished from a mixture of salicylic acid, or its equivalent, and an alkylated phenol. We have pointed out also the relationship between such procedure and the manufacture of resins from salicylic acid alone. What is true in regard to resin manufacture is also true in regard to oxyalkylation. For this reason, and in order to make a suitable comparison, the first few examples in the oxyalkylation series will be concerned with the oxyalkylation of either an alkylated phenol resin in which there is no salicylic acid present, or the oxyalkylation of a resin derived solely from salicylic acid.

*Example 1b*

The resin employed was the acid-catalyzed para-tertiary butylphenol-formaldehyde resin of Example 1a. (Such resin can be purchased in the open market.) The resin was powdered and mixed with an equal weight of xylene, so as to obtain solution by means of a stirring device employing a reflux condenser. 170 grams of the resin were dissolved in or mixed with 170 grams of xylene. To the mixture there was added 1.7 grams of sodium methylate powder. The solution or suspension was placed in an autoclave and approximately 400 grams of ethylene oxide by weight were added in 6 portions of approximately 65 to 75 grams each. After each portion was added, the reaction was permitted to take place for approximately 4 hours. The temperature employed was approximately 150° to 165° C. and a maximum gauge pressure of approximately 150 pounds per square inch. The minimum gauge pressure is approximately 20 pounds per square inch. At the end of each 4-hour period there is no further drop in pressure, thus indicating that all the ethylene oxide present has reacted and the pressure registered on the gauge represents the vapor pressure of xylene at the indicated temperature. After the sixth and final portion of ethylene oxide has been added, a test is made on the resultant.

In one such operation, the resultant, when cold, was a viscous, opaque liquid, emulsifiable in water even in presence of the added xylene. This indicated that incipient emulsification, in absence of xylene, probably appeared at the completion of the fourth addition of ethylene oxide. In other words, 150 grams or 175 grams of ethylene oxide are sufficient to give incipient hydrophile properties in absence of xylene. The initial point approximates ethylene oxide equal to slightly less than 100% of the weight of the initial resin. In this instance in order to obtain greater solubility, the amount of ethylene oxide used for reaction was increased by a second series of additions, using substantially the same conditions of reaction as noted previously. Such series was continued until, as an upper limit, 500 grams of ethylene oxide had been introduced on the basis of the original 170 grams of resin. See the attached table for data as to the compuound in which the ratio of ethylene oxide to resin is about 2:1. A compound of this constitution, containing a small amount of xylene, was light amber in color, miscible with water and had a viscosity resembling that of castor oil.

*Example 2b*

The same reactants, and procedure were employed as in Example 1b, preceding, except that propylene oxide was employed instead of ethylene oxide. The resultant, even on the addition of the alkylene oxide in the weight proportions of the previous example, has diminished hydrophile properties, in comparison with the resultants of Example 1b. This illustrates the point that propylene oxide and butylene oxide give products of lower levels of hydrophile properties than does ethylene oxide.

*Example 3b*

The same reactants and procedure were followed as in Example 1b, except that one mole of glycide was employed initially per hydroxyl radical. This particular reaction was conducted with extreme care and the glycide was added in small amounts representing fractions of a mole. Ethylene oxide was then added, following the procedure of Example 1b, to produce products of greater hydrophile properties. We are extremely hesitant to suggest even the experimental use of glycide and methylglycide, for the reason that disastrous results may be obtained, even in experimentation with laboratory quantities.

*Example 4b*

The resin employed was the one described under the heading of Example 2a, preceding. The amount of resin solution employed was 200 grams. This solution contained 50% by weight of solvent. Sodium methylate equivalent to 2% by weight, based on the resin, was employed as a catalyst. During the first addition of ethylene oxide the maximum temperature employed was 124° C. The maximum gauge pressure was 175 pounds per square inch. The amount of ethylene oxide added was 100 grams. The time required was 2 hours. The product at the end of this time was substantially insoluble. The equipment employed was the same as that described in previous examples, such as Example 1b. This last statement applies to all subsequent examples, of course, also, and also to the further additions of an alkylene oxide in the instant example.

In the second addition of ethylene oxide the maximum temperature employed was 110° C., the maximum pressure 125 pounds, the amount of ethylene oxide added was 100 grams, and the time required for addition was 3 hours. The product at the end of this period was water-emulsifiable.

During the third addition of ethylene oxide the maximum temperature was 146° C., the maximum gauge pressure 115 pounds, the amount of ethylene oxide added 100 grams, and the time required 2 hours. At the end of this time the product was almost water-soluble.

In the fourth addition of ethylene oxide the maximum temperature employed was 162° C., the maximum pressure 105 pounds, the amount of ethylene oxide added 100 grams, and the time required to make the addition was 3½ hours. The product at the end of this time was completely soluble in water and no further addition of ethylene oxide was made.

Example 5b

The resin used was the one described under the heading of Example 3a. The amount of resin solution employed was 200 grams. This solution contained 50% of solvent by weight; 2% of sodium methylate was added, based on the solvent-free resin. In the first addition of ethylene oxide the maximum temperature was 120° C., the maximum pressure was 95 pounds, the amount of ethylene oxide added was 100 grams, the time required was 4 hours, and the product at the end of this time was water-emulsifiable. In the second addition of ethylene oxide the maximum temperature was 94° C., and the maximum pressure 120 pounds. The amount of ethylene oxide added was 100 grams, and the time required to add it was three-fourths of an hour. The product at the end of this period was emulsifiable.

In the third addition of ethylene oxide the maximum temperature was 120° C., the maximum pressure 55 pounds, and the amount of ethylene oxide added was 100 grams. The time required was 2 hours. The product at the end of this time was becoming water-soluble.

In the fourth addition of ethylene oxide the maximum temperature was 134° C., the maximum pressure 80 pounds, the amount of ethylene oxide 100 grams, and the time required to add the oxide was 2 hours. At the end of this addition the product was becoming more soluble.

In the fifth addition of ethylene oxide the maximum temperature was 134° C., the pressure was 120 pounds, the amount of ethylene oxide added was 100 grams. The time required to add the ethylene oxide was 2 hours. The product was still becoming more soluble.

In the sixth addition of ethylene oxide the maximum temperature was 150° C., the maximum pressure 110 pounds, the amount added was 100 grams, and the time required to add the oxide was 2 hours. At the end of this stage the product was almost water-soluble, in fact, the solubility was more than ample for use as a demulsifier and further addition of oxide was stopped.

Example 6b

The final product obtained by use of ethylene oxide in Example 1b, preceding, was treated further with propylene oxide. To the final product, so obtained, in Example 1b, preceding, there was added an additional 1½ grams of sodium methylate and then 100 grams of propylene oxide. The autoclave was sealed and operated in the same manner as in Example 1a. The addition of propylene oxide notwithstanding, the added catalyst was rather slow. The time required to add the propylene oxide was 5 hours at a maximum temperature of 165° C., and a maximum gauge pressure of 150 pounds. The solubility at the end of this period was substantially the same as before, i. e., the final addition of this amount of propylene oxide did not markedly change the solubility characteristics of the resin. This same procedure can, of course, be employed in connection with subsequent examples, such as 7b to 24b, inclusive.

For convenience of comparison, as well as for purpose of brevity, etc., the next series of compounds are presented in tabular form, as follows:

| Ex. No. | Ex. No. of Resin | Wt. of Resin Soln. Used | Wt. of Solvent Free Resin | Solvent Added | Catalyst (NaOMe) |
|---|---|---|---|---|---|
|   |   | Grams | Grams | Grams | Grams |
| 7b | 7a | 200 | 100.0 | 100.0 | 3 |
| 8b | 8a | 200 | 128.4 | 71.6 | 3 |
| 9b | 9a | 200 | 106.5 | 93.5 | 3 |
| 10b | 10a | 200 | 107.0 | 93.0 | 3 |
| 11b | 11a | 300 | 110.0 | 190.0 | 3 |
| 12b | 12a | 300 | 77.6 | 222.4 | 3 |
| 13b | 13a | 300 | 92.0 | 208.0 | 3 |
| 14b | 14a | 300 | 88.5 | 211.5 | 4 |
| 15b | 15a | 300 | 112.0 | 188.0 | 4 |
| 16b | 16a | 300 | 115.5 | 184.5 | 4 |
| 17b | 17a | 300 | 80.6 | 219.4 | 4 |
| 18b | 18a | 300 | 117.5 | 182.5 | 4 |
| 19b | 19a | 300 | 117.5 | 182.5 | 10 |
| 20b | 20a | 300 | 114.6 | 185.4 | 4 |
| 21b | 21a | 300 | 114.6 | 185.4 | 4 |
| 22b | 22a | 300 | 125.0 | 175.0 | 4 |
| 23b | 23a | 300 | 128.8 | 171.2 | 4 |
| 24b | 24a | 300 | 127.0 | 173.0 | 4 |

FIRST OXYETHYLATION STEP

| Ex. No. | ETO Added | Max. Temp., °C. | Max. Press., lbs. sq. in. | Time required | Solubility |
|---|---|---|---|---|---|
|   | Grams |   |   | Hours |   |
| 7b | 110 | 155 | 195 | 5½ | Water-emulsifiable. |
| 8b | 120 | 162 | 170 | 5¼ | Do. |
| 9b | 130 | 150 | 185 | 2 | Do. |
| 10b | 130 | 162 | 220 | 6 | Do. |
| 11b | 130 | 155 | 175 | 5¾ | Do. |
| 12b | 120 | 165 | 180 | 5 | Do. |
| 13b | 120 | 165 | 180 | 5 | Do. |
| 14b | 127 | 162 | 175 | 3 | Do. |
| 15b | 127 | 162 | 165 | 5 | Do. |
| 16b | 110 | 158 | 160 | 3 | Do. |
| 17b | 110 | 155 | 135 | 3 | Do. |
| 18b | 107 | 160 | 170 | 5½ | Do. |
| 19b | 116 | 155 | 180 | 5 | Do. |
| 20b | 121 | 162 | 180 | 5½ | Do. |
| 21b | 121 | 152 | 190 | 4¼ | Do. |
| 22b | 106 | 160 | 170 | 6 | Do. |
| 23b | 100 | 160 | 175 | 6 | Do. |
| 24b | 103 | 165 | 175 | 5¾ | Do. |

SECOND OXYETHYLATION STEP

| Ex. No. | ETO Added | Max. Temp., °C. | Max. Press., lbs. sq. in. | Time required | Solubility |
|---|---|---|---|---|---|
|   | Grams |   |   | Hours |   |
| 7b | 100 | 150 | 210 | 7 | Water-soluble. |
| 8b | 100 | 156 | 180 | 2⅚ | Water-emulsifiable, semi-rubbery. |
| 9b | 100 | 160 | 190 | 5 | Water-emulsifiable. |
| 10b | 100 | 158 | 170 | 5¾ | Do. |
| 11b | 100 | 160 | 216 | 6 | Do. |
| 12b | 100 | 163 | 180 | 6 | Do. |
| 13b | 100 | 163 | 180 | 6 | Do. |
| 14b | 100 | 160 | 170 | 5 | Do. |
| 15b | 100 | 155 | 172 | 5½ | Almost soluble. |
| 16b | 100 | 160 | 180 | 5½ | Water-emulsifiable. |
| 17b | 100 | 155 | 165 | 4½ | Almost water-soluble. |
| 18b | 100 | 150 | 175 | 5 | Water-emulsifiable. |
| 19b | 100 | 165 | 170 | 5½ | Do. |
| 20b | 100 | 158 | 170 | 6 | Do. |
| 21b | 100 | 150 | 160 | 6 | Do. |
| 22b | 100 | 160 | 210 | 5⅔ | Do. |
| 23b | 100 | 160 | 215 | 5⅔ | Do. |
| 24b | 100 | 165 | 175 | 5¾ | Do. |

THIRD OXYETHYLATION STEP

| Ex. No. | ETO Added | Max. Temp., °C. | Max. Press., lbs. sq. in. | Time required | Solubility |
|---|---|---|---|---|---|
|   | Grams |   |   | Hours |   |
| 7b |   |   |   |   |   |
| 8b | 100 | 160 | 190 | 11 | Water-emulsifiable. |
| 9b | 100 | 155 | 155 | 3 | Do. |
| 10b | 100 | 158 | 220 | 6 | Rubberlike, almost water-soluble. |
| 11b | 100 | 160 | 218 | 6 | Almost water-soluble. |
| 12b | 100 | 162 | 175 | 5¾ | Water-soluble. |
| 13b | 100 | 162 | 175 | 5¾ | Do. |
| 14b | 100 | 155 | 180 | 5½ | Do. |
| 15b | 100 | 160 | 170 | 5½ | Do. |
| 16b | 100 | 160 | 160 | 5 | Do. |
| 17b | 100 | 155 | 170 | 5 | Do. |
| 18b | 100 | 158 | 210 | 5¼ | Water-emulsifiable. |
| 19b | 100 | 160 | 180 | 4½ | Water-soluble. |
| 20b | 100 | 160 | 215 | 5⅔ | Do. |
| 21b | 100 | 155 | 202 | 5⅔ | Do. |
| 22b | 100 | 160 | 205 | 7 | Do. |
| 23b | 100 | 160 | 210 | 7 | Do. |
| 24b | 100 | 158 | 195 | 6 | Do. |

FOURTH OXYETHYLATION STEP

| Ex. No. | ETO Added | Max. Temp., °C. | Max. Press., lbs. sq. in. | Time required | Solubility |
|---|---|---|---|---|---|
| | Grams | | | Hours | |
| 7b | | | | | |
| 8b | 100 | 155 | 180 | 11 | Water-soluble. |
| 9b | 100 | 150 | 175 | 4¼ | Water-soluble; almost rubber-like. |
| 18b | 100 | 157 | 205 | 6 | Water-soluble. |
| 22b | 100 | 165 | 175 | 5¾ | Do. |
| 23b | 100 | 160 | 190 | 6½ | Water-emulsifiable. |
| 24b | 100 | 165 | 190 | 4 | Do. |

FIFTH OXYETHYLATION STEP

| Ex. No. | ETO Added | Max. Temp., °C., | Max. Press., lbs. sq. in. | Time required | Solubility |
|---|---|---|---|---|---|
| | Grams | | | Hours | |
| 8b | | | | | 100 g. carbitol added after 2nd ETO, step. |
| 9b | | | | | 100 g. carbitol added after 4th ETO step. |
| 10b | | | | | 100 g. carbitol added after 3rd ETO step. |
| 11b | | | | | Somewhat viscous, tendency to string. |
| 12b | | | | | Non-viscous liquid. |
| 13b | | | | | Do. |
| 14b | | | | | Do. |
| 15b | | | | | Do. |
| 16b | | | | | Do. |
| 17b | | | | | Do. |
| 18b | | | | | Do. |
| 19b | | | | | Do. |
| 20b | | | | | Do. |
| 21b | | | | | Do. |
| 22b | | | | | Do. |
| 23b | 100 | 155 | 198 | 5¼ | Non-viscous liquid, almost water-soluble. |
| 24b | | | | | Non-viscous liquid. |

Attention is directed to the fact that the resins herein described must be fusible and soluble in a non-polar solvent, such as xylene, although obviously, they may be soluble and usually are, in other polar or oxygenated solvents, as previously noted. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenol-aldehyde resins of the type herein specified possess reactive hydroxyl groups and are oxyalkylation-susceptible. Over and above this, the peculiar resins herein described, of course, contain a carboxyl radical which makes them available for a variety of reactants, as previously indicated.

Considerable of what is said immediately herein after is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferably to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Having thus described our invention, what we claim as new and desire to secure by Letters Patent is:

1. Hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive towards both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two, and said phenol being of the formula:

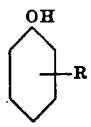

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 30, with the proviso that at least 2 moles of alkylene oxide be introduced for each phenolic nucleus.

2. Hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, xylene-soluble, water-insoluble, low-stage phenol-aldehyde resin; said resin being derived by reaction between a mixture of a difunctional monohydric hydrocarbon-substituted phenol and salicylic acid on the one hand, and an aliphatic aldehyde having not over 8 carbon atoms and having one functional group reactive towards both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two, and said phenol being of the formula:

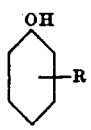

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 30, with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

3. Hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, xylene-soluble, water-insoluble, low-stage phenol-aldehyde resin; said resin being derived by reaction between a mixture of a difunctional monohydric hydrocarbon-substituted phenol and salicylic acid on the one hand, and an aliphatic aldehyde having not over 8 carbon atoms and having one functional group reactive towards both components of the mixture on the other hand; the amount of salicylic acid employed in relation to the non-carboxylated phenol being sufficient to contribute at least one salicylic acid radical per resin molecule; said resin being formed in the substantial absence of phenols of functionality greater than two, and said phenol being of the formula:

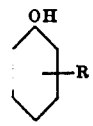

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 30, with the proviso that at least 2 moles of alkylene oxide be introduced for each phenolic nucleus; and with the further proviso that the hydrophile properties of said oxyalkylated resin in an equal weight of xylene are sufficient to produce an emulsion when said xylene solution is shaken vigorously with one to three volumes of water; and with the final proviso that the number of salicylic acid nuclei per resin molecule be not greater than 2.

4. Hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, xylene-soluble, water-insoluble, low-stage, phenol-aldehyde resin; said resin being derived by reaction between a mixture of a difunctional monohydric hydrocarbon-substituted phenol and salicylic acid on the one hand, and an aliphatic aldehyde having not over 8 carbon atoms and having one functional group reactive towards both components of the mixture on the other hand; the amount of salicylic acid employed in relation to the non-carboxylated phenol being sufficient to contribute at least one salicylic acid radical per resin molecule; said resin being formed in the substantial absence of phenols of functionality greater than two; and said phenol being of the formula:

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 30, with the proviso that at least 2 moles of alkylene oxide be introduced for each phenolic nucleus; and with the further proviso that the hydrophile properties of said oxyalkylated resin in an equal weight of xylene are sufficient to produce an emulsion when said xylene solution is shaken vigorously with one to three volumes of water; and with the final proviso that the number of salicylic acid nuclei per resin molecule be not greater than 2.

5. Hydrophile hydroxylated synthetic products; said hydrophile synthetic products being oxyethylation products of (A) ethylene oxide; and (B) an oxyalkylation-susceptible, fusible, xylene-soluble, water-insoluble, low-stage, phenol aldehyde resin; said resin being derived by reaction between a mixture of a difunctional monohydric hydrocarbon-substituted phenol and salicylic acid on the one hand, and an aliphatic aldehyde having not over 8 carbon atoms and having one functional group reactive towards both components of the mixture on the other hand; the amount of salicylic acid employed in relation to the non-carboxylated phenol being sufficient to contribute at least one salicylic acid radical per resin molecule; said resin being formed in the substantial absence of phenols of functionality greater than two; said phenol being of the formula:

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(C_2H_4O)_n$, and $n$ is a numeral varying from 1 to 30, with the proviso that at least 2 moles of alkylene oxide be introduced for each phenolic nucleus; and with the further proviso that the hydrophile properties of said oxyalkylated resin in an equal weight of xylene are sufficient to produce an emulsion when said xylene solution is shaken vigorously with one to three volumes of water; and with the final proviso that the number of salicylic acid nuclei per resin molecule be not greater than 2.

6. Hydrophile hydroxylated synthetic products; said hydrophile synthetic products being oxyethylation products of (A) ethylene oxide; and (B) an oxyalkylation-susceptible, fusible, xylene-soluble, water-insoluble, low-stage phenol-aldehyde resin; said resin being derived by reaction between a mixture of a difunctional monohydric hydrocarbon-substituted phenol and salicylic acid on the one hand, and an aliphatic aldehyde having not over 8 carbon atoms and having one functional group reactive towards both components of the mixture on the other hand; the amount of salicylic acid employed in relation to the non-carboxylated phenol being sufficient to contribute at least one salicylic acid radical per resin molecule; said resin being formed in the substantial absence of phenols of functionality greater than two; said phenol being of the formula:

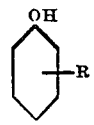

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(C_2H_4O)_n$, and $n$ is a numeral varying from 1 to 30, with the proviso that at least 2 moles of alkylene oxide be introduced for each phenolic nucleus; and with the further proviso that the hydrophile properties of said oxyalkylated resin in an equal weight of xylene are sufficient to produce an emulsion when said xylene solution is shaken vigorously with one to three volumes of water; and with the final proviso that the number of salicylic acid nuclei per resin molecule be not greater than 2.

7. Hydrophile hydroxylated synthetic products; said hydrophile synthetic products being oxyethylation products of (A) ethylene oxide; and (B) an oxyalkylation-susceptible, fusible, xylene-soluble, water-insoluble, low-stage phenol aldehyde resin; said resin being derived by reaction between a mixture of a difunctional monohydric hydrocarbon-substituted phenol and salicylic acid on the one hand, and an aliphatic aldehyde having not over 8 carbon atoms and having one functional group reactive towards both components of the mixture on the other hand; the amount of salicylic acid employed in relation to the non-carboxylated phenol being sufficient to contribute just one salicylic acid radical per resin molecule; said resin being formed in the substantial absence of phenols of functionality greater than two; said phenol being of the formula:

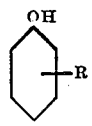

in which R is a hydrocarbon radical having at least 4 and not more than 14 carbon atoms and substituted in one of the positions ortho and para; said oxyalkylated resin being characterized by the introduction into the resin molecule at the phenolic hydroxyl and carboxyl groups of a plurality of divalent radicals having the formula $(C_3H_4O)_n$, and $n$ is a numeral varying from 1 to 30, with the proviso that at least 2 moles of alkylene oxide be introduced for each phenolic nucleus; and with the further proviso that the hydrophile properties of said oxyalkylated resin in an equal weight of xylene are sufficient to produce an emulsion when said xylene solution is shaken vigorously with one to three volumes of water.

8. The product of claim 7, wherein the aldehyde is formaldehyde.

9. The product of claim 7, wherein the aldehyde is formaldehyde and the phenol is tertiary amylphenol.

10. The product of claim 7, wherein the aldehyde is formaldehyde and the phenol is tertiary butylphenol.

11. The product of claim 7, wherein the aldehyde is formaldehyde and the phenol is tertiary nonylphenol.

MELVIN DE GROOTE.
BERNHARD KEISER.

No references cited.